(12) United States Patent
Schoefberger et al.

(10) Patent No.: US 7,559,959 B2
(45) Date of Patent: Jul. 14, 2009

(54) BRIDGED MONOAZO DYES

(75) Inventors: Georg Schoefberger, Rheinfelden (CH); Ulrich Geiger, Neuenburg/Rhein (DE)

(73) Assignee: Clariant Finance (BVI) Limited, Tortola (VG)

( * ) Notice: Subject to any disclaimer, the term of this patent is extended or adjusted under 35 U.S.C. 154(b) by 337 days.

(21) Appl. No.: 11/596,940

(22) PCT Filed: May 12, 2005

(86) PCT No.: PCT/IB2005/001419

§ 371 (c)(1),
(2), (4) Date: Nov. 17, 2006

(87) PCT Pub. No.: WO2005/113680

PCT Pub. Date: Dec. 1, 2005

(65) Prior Publication Data

US 2007/0220687 A1    Sep. 27, 2007

(30) Foreign Application Priority Data

May 19, 2004    (EP)    .................................. 04011855

(51) Int. Cl.
*C09B 49/06*    (2006.01)
*C07D 277/62*    (2006.01)
(52) U.S. Cl. ...................... 8/652; 8/662; 8/664; 8/670; 8/676; 8/681; 8/684; 8/127.5; 8/128.1; 548/156
(58) Field of Classification Search .................. 8/652, 8/662, 664, 670, 676, 681, 684, 127.5, 128.1; 548/156
See application file for complete search history.

(56) References Cited

U.S. PATENT DOCUMENTS

| 4,041,024 A | 8/1977 | Wolfrum et al. |
| 4,517,358 A | 5/1985 | Visvanathan |
| 4,581,445 A | 4/1986 | Visvanathan |

FOREIGN PATENT DOCUMENTS

| JP | 04046186 | * | 2/1992 |
| JP | 04-046186 A | | 5/1992 |
| WO | WO99/51681 A1 | | 10/1999 |
| WO | WO2002/46318 A1 | | 6/2002 |

OTHER PUBLICATIONS

STIC Search Report dated Dec. 3, 2008.*
Bull. Soc. Chim. France 1974, 641-648.
Ullmanns Encyklopädie der technischen Chemie, 4th Edition, 1982, vol. 22, pp. 658 - 673.
M. Peter and H.K. Rouette, Grundlagen der Textilveredlung, 13th Edition, 1989, pp. 535 - 556 and 566 - 574.
PCT International Search Report for PCT/IB2005/001419, dated Oct. 5, 2005.
PCT Written Opinion of the International Searching Authority for PCT/IB2005/001419, dated Oct. 5, 2005.
English Abstract for JP 04-046186. (1992).

* cited by examiner

*Primary Examiner*—Eisa B Elhilo
(74) *Attorney, Agent, or Firm*—Tod A. Waldrop

(57) ABSTRACT

Compounds of the general formula (I)

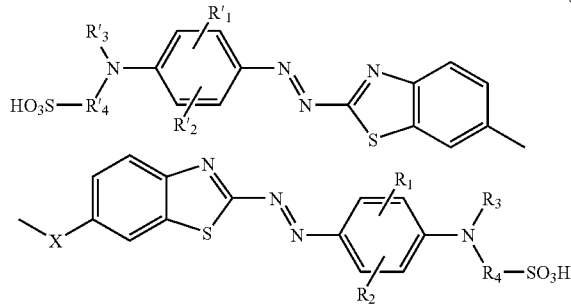

a process for their preparation and their use for dyeing and/or printing organic substrates.

15 Claims, No Drawings

BRIDGED MONOAZO DYES

The invention relates to novel acid dyes, to a process for their preparation and to their use for dyeing organic substrates.

Bridged dyes based on benzothiazole are known. Yet there continues to be a demand for bridged benzothiazole dyes having improved properties.

The invention provides compounds of the general formula (I)

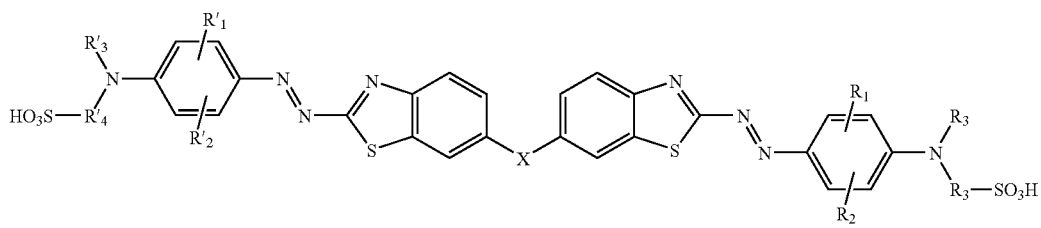

where
- $R_1$, $R'_1$, $R_2$ and $R'_2$ are independently hydrogen, unbranched $C_{1-6}$alkyl or branched $C_{3-6}$alkyl, unbranched $C_{1-6}$alkoxy or branched $C_{3-6}$alkoxy, halogen or —NHCO—($C_{1-6}$alkyl) with an unbranched $C_{1-6}$alkyl group or —NHCO—($C_{3-6}$alkyl) with a branched $C_{3-6}$alkyl group,
- $R_3$ and $R'_3$ are independently unbranched $C_{1-6}$alkyl or branched $C_{3-6}$alkyl,
- $R_4$ and $R'_4$ are independently unbranched $C_{1-6}$alkylene or branched $C_{3-6}$-alkylene or arylene or —CH$_2$-arylene which is optionally substituted by unbranched $C_{1-6}$alkyl or branched $C_{3-6}$alkyl, —OH, —CN or by further —SO$_3$H groups, and
- X is any bridge or a direct bond.

In preferred compounds of the formula (I) X is a direct bond or a bridge of the formula —(CH$_2$)$_y$— where y is 1, 2, 3, 4, 5 or 6, or branched $C_{3-6}$alkylene which can be further substituted by —OH or —CN or the bridge X is —CH=CH—, $C_{3-6}$alkylene, phenylene, naphthylene or a five-membered or six-membered ring which can also contain one or two heteroatoms, or X is a bridge of N, S or O, or —NH—($C_{1-6}$)-alkylene-NH—, —NH— arylene-NH—, —NH—C(O)—, —NH—C(O)—NH—, —NH—C(O)-A-C(O)—NH—, CO, SO$_2$, NH or a heteroatom, or X is a bridge C wherein this carbon atom C is a member of a five or six-membered aliphatic ring which is further unsubstituted or is substituted by unbranched $C_{1-6}$alkyl or branched $C_{3-6}$alkyl, unbranched $C_{1-6}$alkoxy or branched $C_{3-6}$alkoxy, —OH or —CN.

A in —NH—C(O)-A-C(O)—NH— is a group of the formula —(CH$_2$)$_y$— where y is 1, 2, 3, 4, 5, or 6, or branched $C_{3-6}$alkylene which can be substituted by —OH or —CN or is —CH=CH—, phenylene, naphthylene or a five-membered or six-membered ring which can also contain one or two heteroatoms especially N, S or O.

In further preferred compounds, the bridge X is a bridge of the formula —(CH$_2$)$_{y'}$— where y' is 1, 2, 3 or 4, especially —CH$_2$— or —CH$_2$CH$_2$—, or branched $C_{3-4}$alkyl, especially —C(CH$_3$)$_2$—, CO, SO$_2$, NH or —NH—C(O)—NH—. In further preferred compounds the bridge X is a heteroatom selected from the group of S or O. In particularly preferred compounds the bridge X is —CH$_2$— or —CH$_2$CH$_2$—.

In further preferred compounds, the bridge X is a bridge of the formula

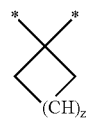

wherein z is independently 5 or 6, wherein the asterix defines the point of attachment to the benzthiazole part of the dyestuff. By preference X is the bridging cyclohexyl moiety

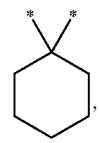

wherein the asterix defines the point of attachment to the benzthiazole part of the dyestuff.

In preferred compounds of the formula (I)
- $R_1$, $R'_1$, $R_2$ and $R'_2$ are independently hydrogen, unbranched $C_{1-4}$alkyl or branched $C_{3-4}$alkyl, unbranched $C_{1-4}$alkoxy or branched $C_{3-4}$alkoxy, halogen or —NHCO—($C_{1-4}$alkyl) with an unbranched $C_{1-4}$alkyl group or —NHCO—($C_{3-4}$alkyl) with a branched $C_{3-4}$alkyl group,
- $R_3$ and $R'_3$ are independently unbranched $C_{1-4}$alkyl or branched $C_{3-4}$alkyl,
- $R_4$ and $R'_4$ are independently arylene or —CH$_2$-arylene which is optionally substituted by unbranched $C_{1-6}$alkyl or branched $C_{3-6}$alkyl, —OH, —CN or by further —SO$_3$H groups, and
- X is any bridge or a direct bond.

In more preferred compounds of the formula (I)
- $R_1$, $R'_1$, $R_2$ and $R'_2$ are independently hydrogen, methyl, ethyl, methoxy, ethoxy, halogen or acylamino,
- $R_3$ and $R'_3$ are independently methyl or ethyl, R$_4$ and R'$_4$ are independently arylene or —CH$_2$— arylene which is optionally substituted by unbranched C$_{1-6}$alkyl or branched C$_{3-6}$alkyl, —OH, —CN or by further —SO$_3$H groups, and X is any bridge or a direct bond.

Very particular preference is given to compounds of the formula (I) where

R$_1$, R'$_1$, R$_2$ and R'$_2$ are independently hydrogen, methyl, ethyl, methoxy, ethoxy, halogen or acylamino, R$_3$ and R'$_3$ are each ethyl, R$_4$ and R'$_4$ are independently benzylene which is optionally substituted by unbranched C$_{1-6}$alkyl or branched C$_{3-6}$alkyl, —OH, —CN or by further —SO$_3$H groups, and X is any bridge or a direct bond.

Very particular preference is further given to compounds of the formula (I) where R$_4$ and R'$_4$ is a —CH$_2$-phenylene group which is not further substituted. It is very particularly preferred for the groups —R$_4$—SO$_4$H and —R'$_4$—SO$_4$H to be

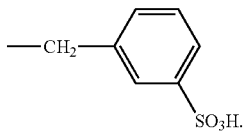

The branched C$_{3-6}$alkyl groups or unbranched C$_{1-6}$alkyl groups can be further substituted with hydroxyl groups or cyano groups. Preferably, the alkyl groups are not further substituted.

The invention also provides a process for preparing compounds of the formula (I). The invention's compounds of the formula (I) can be prepared in conventional processes under conventional conditions.

In the process of the invention, compounds of the formula (II)

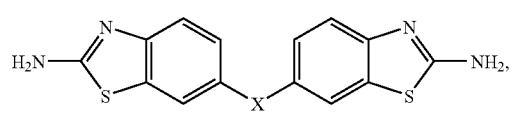

which are known from the literature or synthesized as per Bull. Soc. Chim. France 1974, 641-648, are conventionally diazotized and coupled onto two equivalents of a compound of the formula (III)

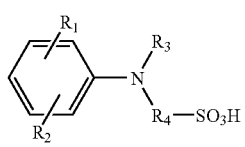

where the substituents are each as defined above. The diamine is cooled down to 0-10° C. or preferably to 0-5° C. and diazotized by addition of nitrosylsulphuric acid. Thereafter, the diazotized amine is allowed to react with the compound (III), preferably in aqueous solution.

The dyes of the formula (I) can be isolated from the reaction medium as per known processes, for example by salting out with an alkali metal salt, filtration and drying, if appropriate under reduced pressure at elevated temperature.

Depending on the reaction and/or isolation conditions, the dyes of the formula (I) can be obtained as free acid, as salt or as mixed salt which contains for example one or more cations selected from alkali metal ions, for example the sodium ion, or an ammonium ion or alkylammonium cation, for example mono-, di- or trimethyl- or -ethylammonium cations. The dye can be converted by conventional techniques from the free acid into a salt or into a mixed salt or vice versa or from one salt form into another. If desired, the dyes can be further purified by diafiltration, in which case unwanted salts and synthesis by-products are separated from the crude anionic dye. In diafiltration, the crude dye is forced through a semipermeable membrane under an applied pressure to remove salts and synthesis by-products and partly remove water.

The dyes of the formula (I) and their salts are particularly suitable for dyeing or printing fibrous material consisting of natural or synthetic polyamides in red to violet shades. The dyes of the formula (I) and their salts are suitable for producing Inkjet printing inks and for using these Inkjet printing inks to print fibrous material which consists of natural or synthetic polyamides or cellulose (paper for example).

The invention accordingly provides from another aspect for the use of the dyes of the formula (I), their salts and mixtures for dyeing and/or printing fibrous materials consisting of natural or synthetic polyamides. A further aspect is the production of Inkjet printing inks and their use for printing fibrous materials consisting of natural or synthetic polyamides.

Dyeing is carried out as per known processes, see for example the dyeing processes described in Ullmanns Encyklopädie der technischen Chemie, 4th Edition, 1982, Volume 22, pages 658-673 or in the book by M. Peter and H. K. Rouette, Grundlagen der Textilveredlung, 13th Edition, 1989, pages 535-556 and 566-574. Preference is given to dyeing in the exhaust process at a temperature of 30 to 140° C., more preferably 80 to 120° C. and most preferably at a temperature of 80 to 100° C., and at a liquor ratio in the range from 3:1 to 40:1.

The substrate to be dyed can be present in the form of yarn, woven fabric, loop-formingly knitted fabric or carpet for example. Fully fashioned dyeings are even permanently possible on delicate substrates, examples being lambswool, cashmere, alpaca and mohair. The dyes of the invention are particularly useful for dyeing fine-denier fibres (microfibres).

The dyes according to the present invention and their salts are highly compatible with known acid dyes. Accordingly, the dyes of the formula (I), their salts or mixtures can be used alone in a dyeing or printing process or else as a component in a combination shade dyeing or printing composition together with other acid dyes of the same class, i.e. with acid dyes possessing comparable dyeing properties, such as for example fastness properties and exhaustion rates from the dyebath onto the substrate. The dyes of the present invention can be used in particular together with certain other dyes having suitable chromophores. The ratio in which the dyes are present in a combination shade dyeing or printing composition is dictated by the hue to be obtained.

The novel dyes of the formula (I), as stated above, are very useful for dyeing natural and synthetic polyamides, i.e. wool, silk and all nylon types, on each of which dyeings having a high fastness level, especially good light fastness and good wet fastnesses (washing, alkaline perspiration) are obtained. The dyes of the formula (I) and their salts have a high rate of exhaustion. The ability of the dyes of the formula (I) and their salt to build up is likewise very good. On-tone dyeings on the identified substrates are of outstanding quality. All dyeings moreover have a constant hue under artificial light. Furthermore, the fastness to decating and boiling is good.

One decisive advantage of the novel dyes is that they are metal free and provide very level dyeings.

The compounds according to the invention can be used as an individual dye or else, owing to their good compatibility, as a combination element with other dyes of the same class having comparable dyeing properties, for example with regard to general fastnesses, exhaustion value, etc. The combination shade dyeings obtained have similar fastnesses to dyeings with the individual dye.

The invention's dyes of the formula (I) can also be used as red components in trichromatic dyeing or printing. Trichromatic dyeing or printing can utilize all customary and known dyeing and printing processes, such as for example the continuous process, exhaustion process, foam dyeing process and Ink-Jet process.

The composition of the individual dye components in the trichromatic dye mixture used in the process of the invention depends on the desired hue. A brown hue for example preferably utilizes 55-65% by weight of a yellow component, 20-30% by weight of the invention's red component and 10-20% by weight of a blue component.

The yellow component, as described above, can consist of a single component or of a mixture of different red individual components conforming to the formula (I). Preference is given to double and triple combinations. When a red individual component consisting of just one red component of the formula (III) is to be used, it should not account for more than 50% by weight of the trichromatic dye mixture.

Particularly preferred blue and/or yellow components are described in WO2002/46318.

In the examples which follow, parts and percentages are by weight and temperatures are reported in degrees Celsius.

PREPARATION EXAMPLE 1

31.2 parts of the diamine of the structure

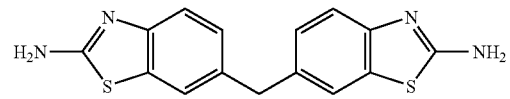

are suspended at 50° C. in 500 parts of 85% phosphoric acid and 200 parts of acetic acid. The suspension is cooled down to 0-5° C. and diazotized by addition of 67 parts of 40% nitrosylsulphuric acid. Excess nitrite is destroyed with urea after one hour.

61.2 parts of N-ethyl-N-benzylaminobenzene-3'-sulphonic acid are dissolved in 500 parts of water and 30% caustic soda at pH 9. 300 parts of ice are added to cool down to 0° C. before the diazo compound is metered in at not more than 5° C. over an hour. The dye suspension obtained is heated to 70° C. and filtered off.

The residue is dissolved at 70° C. in 1500 parts of water with caustic soda at pH 10. The dye is reprecipitated by addition of 50 parts of sodium chloride and 2000 parts of alcohol and filtered. It conforms to the structure

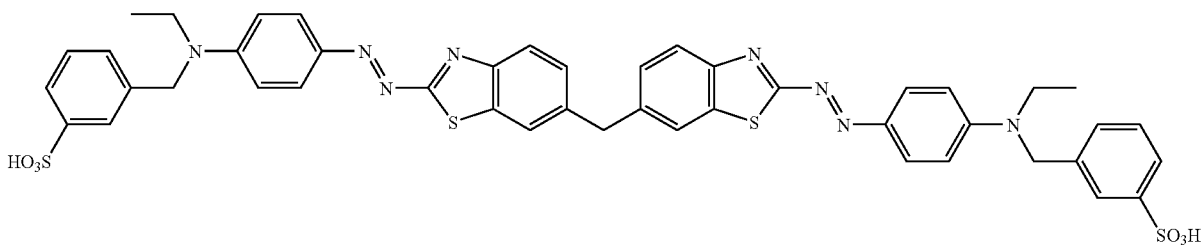

and dyes polyamides and wool in a red hue with a high build-up capacity. The dyeings have excellent wet fastnesses and good light fastness. $\lambda_{max}$ (dimethylformamide:water 1:1 (weight/weight)+0.2 weight-% ammonium acetate): 536 nm The following dyes can be prepared similarly to Preparation Example 1 (The λmax were measured in a dimethylformamide with water in 1:1 ratio (weight/weight)+0.2 weight-% ammonium acetate (dimethylformamide:water 1:1 w/w+0.2 wt.-% ammonium acetate):

| Ex. | X | $R_1$ | $R_2$ | $R_3$ | $R_4$ | $\lambda_{max}$ [nm] |
|---|---|---|---|---|---|---|
| 2 | $CH_2CH_2$ | H | H | $C_2H_5$ | $-CH_2-\text{C}_6\text{H}_4-SO_3H$ (m) | 530 |
| 3 | $CH_2$ | H | $CH_3$ | $C_2H_5$ | $-CH_2-\text{C}_6\text{H}_4-SO_3H$ (m) | 544 |
| 4 | O | H | H | $C_2H_5$ | $-CH_2-\text{C}_6\text{H}_4-SO_3H$ (m) | 544 |
| 5 | O | H | $CH_3$ | $C_2H_5$ | $-CH_2-\text{C}_6\text{H}_4-SO_3H$ (m) | 550 |
| 6 | O | H | H | $C_2H_5$ | $CH_2CH_2SO_3H$ | 540 |
| 7 | O | H | $NHCOCH_3$ | $C_2H_5$ | $-CH_2-\text{C}_6\text{H}_4-SO_3H$ (m) | 581 |
| 8 | $C(CH_3)_2$ | H | H | $C_2H_5$ | $-CH_2-\text{C}_6\text{H}_4-SO_3H$ (m) | 535 |
| 9 | $SO_2$ | H | H | $C_2H_5$ | $-CH_2-\text{C}_6\text{H}_4-SO_3H$ (m) | 554 |

-continued
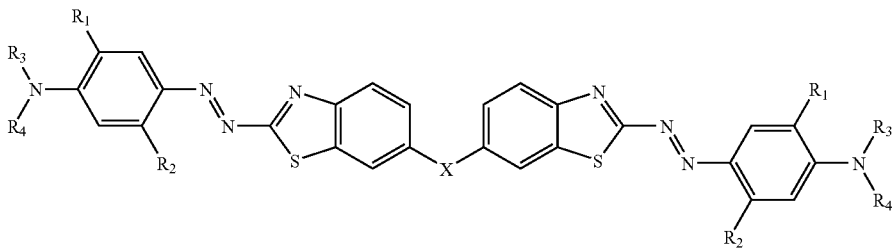
| Ex. | X | R₁ | R₂ | R₃ | R₄ | $\lambda_{max}$ [nm] |
|---|---|---|---|---|---|---|
| 10 | SO₂ | H | CH₃ | C₂H₅ | —CH₂—C₆H₄—SO₃H | 562 |
| 11 | SO₂ | H | NHCOCH₃ | C₂H₅ | —CH₂—C₆H₄—SO₃H | 584 |
| 12 | CH₂ | H | H | C₄H₉ | —CH₂—C₆H₄—SO₃H | 537 |
| 13 | CH₂ | H | CH₃ | C₄H₉ | —CH₂—C₆H₄—SO₃H | 546 |
| 14 | C(CH₃)₂ | H | CH₃ | C₂H₅ | —CH₂—C₆H₄—SO₃H | 543 |
| 15 | CO | H | H | C₂H₅ | —CH₂—C₆H₄—SO₃H | 546 |
| 16 | CH₂ | H | H | CH₃ | —CH₂—C₆H₄—SO₃H | 535 |
| 17 | CH₂CH₂ | H | H | CH₃ | —CH₂—C₆H₄—SO₃H | 529 |

-continued
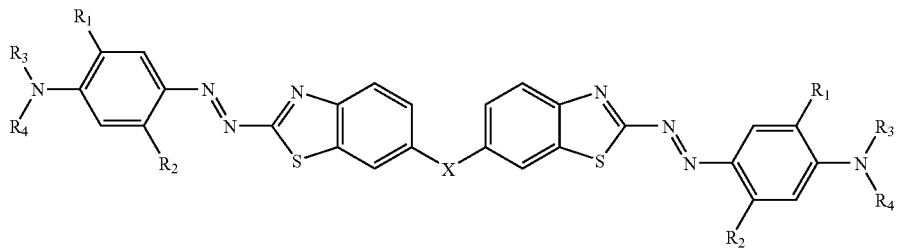
| Ex. | X | R₁ | R₂ | R₃ | R₄ | $\lambda_{max}$ [nm] |
|---|---|---|---|---|---|---|
| 18 | CH₂CH₂ | H | CH₃ | CH₃ | —CH₂—C₆H₄—SO₃H | 537 |
| 19 | C(CH2)₅ | H | H | C₂H₅ | —CH₂—C₆H₄—SO₃H | 533 |
| 20 | C(CH2)₅ | H | NHCOCH₃ | C₂H₅ | —CH₂—C₆H₄—SO₃H | 574 |
| 21 | CO | H | CH₃ | C₂H₅ | —CH₂—C₆H₄—SO₃H | 555 |
| 22 | CO | H | NHCOCH₃ | C₂H₅ | —CH₂—C₆H₄—SO₃H | 587 |
| 23 | CH₂CH₂ | H | CH₃ | C₂H₅ | —CH₂—C₆H₄—SO₃H | 537 |
| 24 | CH₂CH₂ | H | H | C₄H₉ | —CH₂—C₆H₄—SO₃H | 532 |
| 25 | CH₂CH₂ | H | CH₃ | C₄H₉ | —CH₂—C₆H₄—SO₃H | 538 |

-continued
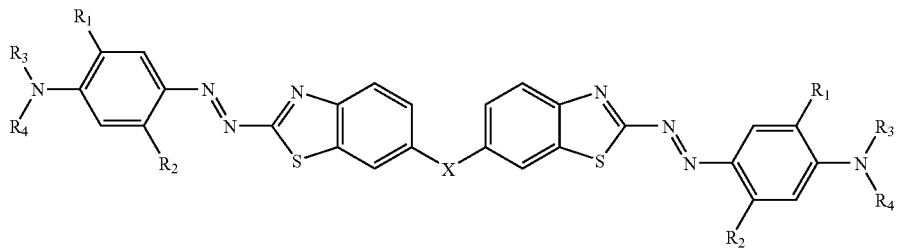
| Ex. | X | R$_1$ | R$_2$ | R$_3$ | R$_4$ | $\lambda_{max}$ [nm] |
|---|---|---|---|---|---|---|
| 26 | C(CH$_3$)$_2$ | H | NHCOCH$_3$ | C$_2$H$_5$ | —CH$_2$-C$_6$H$_4$-SO$_3$H | 571 |
| 27 | CH$_2$ | H | NHCOCH$_3$ | C$_2$H$_5$ | —CH$_2$-C$_6$H$_4$-SO$_3$H | 573 |
| 28 | CH$_2$ | H | CH$_3$ | CH$_3$ | —CH$_2$-C$_6$H$_4$-SO$_3$H | 543 |
| 29 | C(CH$_2$)$_5$ | H | H | C$_4$H$_9$ | —CH$_2$-C$_6$H$_4$-SO$_3$H | 535 |
| 30 | C(CH$_2$)$_5$ | OCH$_3$ | CH$_3$ | C$_2$H$_5$ | —CH$_2$-C$_6$H$_4$-SO$_3$H | 555 |
| 31 | C(CH$_2$)$_5$ | H | H | CH$_3$ | —CH$_2$-C$_6$H$_4$-SO$_3$H | 534 |
| 32 | CH$_2$CH$_2$ | H | NHCOCH$_3$ | C$_2$H$_5$ | —CH$_2$-C$_6$H$_4$-SO$_3$H | 566 |
| 33 | O | H | CH$_3$ | C$_4$H$_9$ | —CH$_2$-C$_6$H$_4$-SO$_3$H | 552 |

-continued

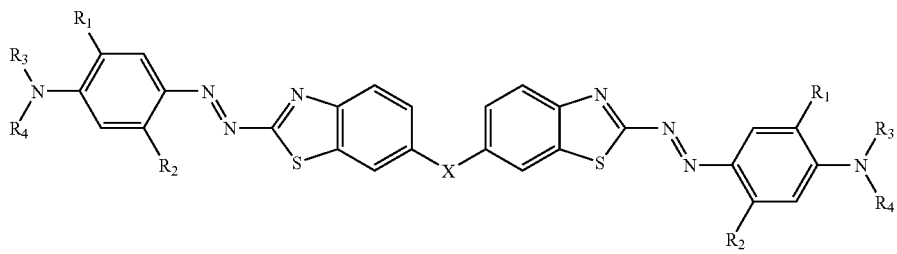

| Ex. | X | $R_1$ | $R_2$ | $R_3$ | $R_4$ | $\lambda_{max}$ [nm] |
|---|---|---|---|---|---|---|
| 34 | O | H | H | $C_4H_9$ | —$CH_2$—C$_6$H$_4$—$SO_3H$ (m) | 546 |
| 35 | C(CH2)$_5$ | H | $CH_3$ | $CH_3$ | —$CH_2$—C$_6$H$_4$—$SO_3H$ (m) | 542 |
| 36 | O | H | $CH_3$ | $CH_3$ | —$CH_2$—C$_6$H$_4$—$SO_3H$ (m) | 551 |
| 37 | $CH_2$ | $OCH_3$ | $CH_3$ | $C_2H_5$ | —$CH_2$—C$_6$H$_4$—$SO_3H$ (m) | 557 |
| 38 | O | H | H | $CH_3$ | —$CH_2$—C$_6$H$_4$—$SO_3H$ (m) | 544 |
| 39 | C(CH2)$_5$ | H | $CH_3$ | $C_4H_9$ | —$CH_2$—C$_6$H$_4$—$SO_3H$ (m) | 544 |
| 40 | $CH_2CH_2$ | H | H | $C_2H_5$ | $CH_2CH_2SO_3H$ | 525 |
| 41 | $CH_2CH_2$ | $OCH_3$ | $CH_3$ | $C_2H_5$ | —$CH_2$—C$_6$H$_4$—$SO_3H$ (m) | 554 |
| 42 | $CH_2$ | H | H | $C_2H_5$ | $CH_2CH_2SO_3H$ | 530 |
| 43 | C(CH2)$_5$ | H | $CH_3$ | $C_2H_5$ | —$CH_2$—C$_6$H$_4$—$SO_3H$ (m) | 542 |

C(CH$_2$)$_6$ signifies the bridging cyclohexyl moiety

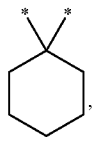

wherein the asterix define the point of attachment to the benzthiazole part of the dyestuff.

USE EXAMPLE A

A dyebath at 40° C., consisting of 2000 parts of water, 1 part of a weakly cation-active levelling agent which is based on an ethoxylated aminopropyl fatty acid amide and which has affinity for dye, 0.25 parts of the dye of Preparation Example 1 and adjusted to pH 5 with 1-2 parts of 40% acetic acid is entered with 100 parts of nylon-6 fabric. After 10 minutes at 40° C., the dyebath is heated to 98° C. at a rate of 1° C. per minute and then left at the boil for 45-60 minutes. Thereafter it is cooled down to 70° C. over 15 minutes. The dyeing is removed from the bath, rinsed with hot and then with cold water and dried. The result obtained is a red polyamide dyeing possessing good light and wet fastnesses.

USE EXAMPLE B

A dyebath at 40° C., consisting of 2000 parts of water, 1 part of a weakly cation-active levelling agent which is based on an ethoxylated aminopropyl fatty acid amide and which has affinity for dye, 0.3 parts of the dye of Preparation Example 1 and adjusted to pH 5.5 with 1-2 parts of 40% acetic acid is entered with 100 parts of nylon-6,6 fabric. After 10 minutes at 40° C., the dyebath is heated to 120° C. at a rate of 1.5° C. per minute and then left at this temperature for 15-25 minutes. Thereafter it is cooled down to 70° C. over 25 minutes. The dyeing is removed from the dyebath, rinsed with hot and then with cold water and dried. The result obtained is a red polyamide dyeing with good levelness and having good light and wet fastnesses.

USE EXAMPLE C

A dyebath at 40° C., consisting of 4000 parts of water, 1 part of a weakly amphoteric levelling agent which is based on a sulfated, ethoxylated fatty acid amide and which has affinity for dye, 0.4 parts of the dye of Preparation Example 1 and adjusted to pH 5 with 1-2 parts of 40% acetic acid is entered with 100 parts of wool fabric. After 10 minutes at 40° C., the dyebath is heated to boiling at a rate of 1° C. per minute and then left at the boil for 40-60 minutes. Thereafter it is cooled down to 70° C. over 20 minutes. The dyeing is removed from the bath, rinsed with hot and then with cold water and dried. The result obtained is a red wool dyeing possessing good light and wet fastnesses.

USE EXAMPLE D 100 parts of a woven nylon-6 material are padded with a 50° C. liquor consisting of

| | |
|---|---|
| 40 | parts of the dye of Preparation Example 1, |
| 100 | parts of urea, |
| 20 | parts of a nonionic solubilizer based on butyldiglycol, |
| 15-20 | parts of acetic acid (to adjust the pH to 4), |
| 10 | parts of a weakly cation-active levelling agent which is based on an ethoxylated aminopropyl fatty acid amide and has affinity for dye, and |
| 810-815 | parts of water (to make up to 1000 parts of padding liquor). |

The material thus impregnated is rolled up and left to dwell in a steaming chamber under saturated steam conditions at 85-98° C. for 3-6 hours for fixation. The dyeing is then rinsed with hot and cold water and dried. The result obtained is a red nylon dyeing having good levelness in the piece and good light and wet fastnesses.

USE EXAMPLE E

A textile cut pile sheet material composed of nylon-6 and having a synthetic base fabric is padded with a liquor containing per 1000 parts

| | |
|---|---|
| 1 | part of dye of Preparation Example 1 |
| 4 | parts of a commercially available thickener based on carob flour ether |
| 2 | parts of a nonionic ethylene oxide adduct of a higher alkylphenol |
| 1 | part of 60% acetic acid. |

This is followed by printing with a paste which per 1000 parts contains the following components:

| | |
|---|---|
| 20 | parts of commercially available alkoxylated fatty alkylamine (displace product) |
| 20 | parts of a commercially available thickener based on carob flour ether. |

The print is fixed for 6 minutes in saturated steam at 100° C., rinsed and dried. The result obtained is a level-coloured cover material having a red and white pattern.

USE EXAMPLE F

A dyebath at 40° C. consisting of 2000 parts of water, 1 part of a weakly cation-active levelling agent which is based on an ethoxylated aminopropyl fatty acid amide and has affinity for dye, 0.2 part of the dye of Preparation Example 1, 1.5 parts of a commercially available preparation of C.I. Acid Yellow 236 (Nylosan Yellow F-L) and 0.5 part of the blue dye of Example 46 of the patent application WO99/51681 or of EP1066340 B1:

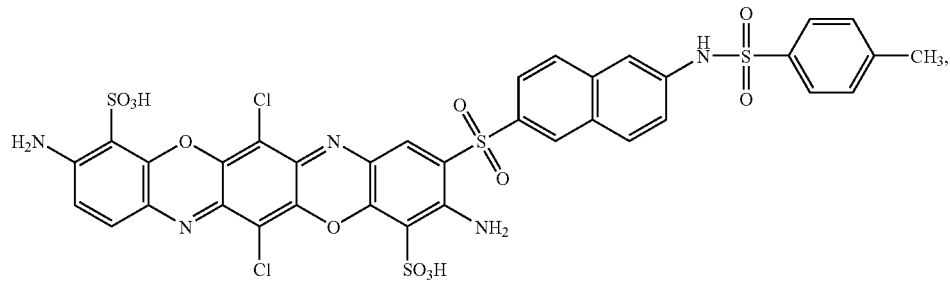

Example 46 of the patent application WO99/51681 or of EP 1066340 B1 adjusted to pH 5 with 1-2 parts of 40% acetic acid is entered with 100 parts of woven nylon-6,6 fabric. After 10 minutes at 40° C., the dyebath is heated to 98° C. at a rate of 1° C. per minute and then left at the boil for 45 to 60 minutes. This is followed by cooling down to 70° C. over 15 minutes. The dyeing is removed from the bath, rinsed with hot and then with cold water and dried. The result obtained is a level grey polyamide dyeing having good light and wet fastnesses.

USE EXAMPLE G 100 parts of a chrome-tanned and synthetically retanned shave-moist grain leather are dyed for 30 minutes in a bath of 300 parts of water and 2 parts of the dye of Preparation Example 1 at 55° C. After addition of 4 parts of a 60% emulsion of a sulphited fish oil, the leather is fatliquored for 45 minutes. It is then acidified with 8.5% formic acid and milled for 10 minutes (final pH in the bath 3.5-4.0). The leather is then rinsed, allowed to drip dry and finished as usual. The result obtained is a leather dyed in a level clear red hue with good fastnesses.

Use Examples A to G can also be carried out with dyes 2 to 43 with similar results.

USE EXAMPLE H 3 parts of the dye of Preparation Example 3 are dissolved in 82 parts of demineralized water and 15 parts of diethylene glycol at 60° C. Cooling down to room temperature gives a red printing ink which is very highly suitable for ink jet printing on paper or polyamide and wool textiles.

Use Example H can also be carried out with dyes 1 or 2 and 4 to 43 with similar results.

The invention claimed is:

1. A compound of formula (I)

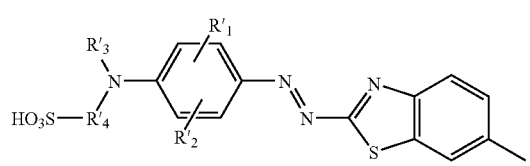

(I)

-continued

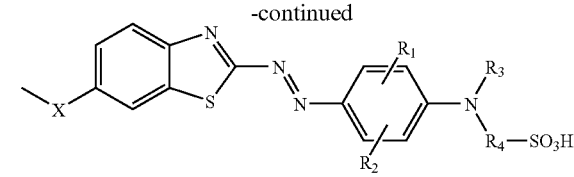

wherein $R_1$, $R'_1$, $R_2$ and $R'_2$ are independently hydrogen, unbranched $C_{1-6}$alkyl or branched $C_{3-6}$alkyl, unbranched $C_{1-6}$alkoxy or branched $C_{3-6}$alkoxy, halogen or —NHCO—($C_{1-6}$alkyl) with an unbranched $C_{1-6}$alkyl group or —NHCO—($C_{3-6}$alkyl) with a branched $C_{3-6}$alkyl group, $R_3$ and $R'_3$ are independently unbranched $C_{1-6}$alkyl or branched $C_{3-6}$alkyl, $R_4$ and $R'_4$ are independently unbranched $C_{1-6}$alkylene or branched $C_{3-6}$alkylene or arylene or —CH$_2$-arylene optionally substituted by unbranched $C_{1-6}$alkyl or branched $C_{3-6}$alkyl, —OH, —CN or by further —SO$_3$H groups, and X is a bridge or a direct bond.

2. A compound according to claim 1 wherein $R_1$, $R'_1$, $R_2$ and $R'_2$ are independently hydrogen, unbranched $C_{1-4}$alkyl or branched $C_{3-4}$alkyl, unbranched $C_{1-4}$alkoxy or branched $C_{3-4}$alkoxy, halogen or —NHCO—($C_{1-4}$alkyl) with an unbranched $C_{1-4}$alkyl group or —NHCO—($C_{3-4}$alkyl) with a branched $C_{3-4}$alkyl group, $R_3$ and $R'_3$ are independently unbranched $C_{1-4}$alkyl or branched $C_{3-4}$alkyl, $R_4$ and $R'_4$ are independently arylene or —CH$_2$-arylene, and X is a bridge or a direct bond.

3. A compound according to claim 1 wherein $R_1$, $R'_1$, $R_2$ and $R'_2$ are independently hydrogen, methyl, ethyl, methoxy, ethoxy, halogen or acylamino, $R_3$ and $R'_3$ are independently methyl or ethyl, $R_4$ and $R'_4$ are independently arylene or —CH$_2$-arylene, and X is a bridge or a direct bond.

4. A compound according to claim 1, wherein

X is a direct bond or is a bridge of the formula —(CH$_2$)$_y$— where y is 1, 2, 3, 4, 5 or 6, or is a branched $C_{3-6}$-alkylene optionally substituted by —OH or —CN or is —CH═CH—, $C_{3-6}$-alkylene, phenylene, naphthylene or a five-membered or six-membered ring optionally containing one or two heteroatoms.

5. A process for preparing a compound of the formula (I) according to claim 1, comprising the steps of diazotizing a compound of formula (II) to form a diazotized amine

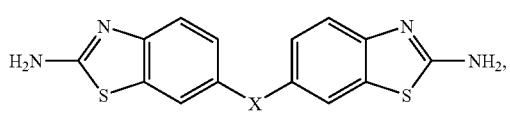 (II)

and subsequently coupling the diazotized amine onto two equivalents of a compound of the formula (III)

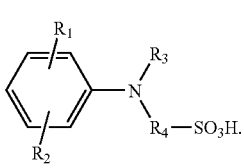 (III)

6. A process for dyeing and/or printing an organic substrate, comprising the step of contacting a compound of formula (I) according to claim 1 with the organic substrate.

7. A process for dyeing and/or printing wool, silk or a synthetic polyamide comprising the step of contacting a compound of formula (I) according to claim 1 with the wool, silk or a synthetic polyamide.

8. An inkjet ink comprising a compound of the formula (I) according to claim 1.

9. A compound according to claim 1 wherein $R_1$, $R'_1$, $R_2$ and $R'_2$ are independently hydrogen, unbranched $C_{1-4}$alkyl or branched $C_{3-4}$alkyl, unbranched $C_{1-4}$alkoxy or branched $C_{3-4}$alkoxy, halogen or —NHCO—($C_{1-4}$alkyl) with an unbranched $C_{1-4}$alkyl group or —NHCO—($C_{3-4}$alkyl) with a branched $C_{3-4}$alkyl group, $R_3$ and $R'_3$ are independently unbranched $C_{1-4}$alkyl or branched $C_{3-4}$alkyl, $R_4$ and $R'_4$ are independently arylene or —$CH_2$-arylene substituted by unbranched $C_{1-6}$-alkyl or branched $C_{3-6}$alkyl, —OH, —CN or by further —$SO_3H$ groups, and X is a bridge or a direct bond.

10. A compound according to claim 1 wherein $R_1$, $R'_1$, $R_2$ and $R'_2$ are independently hydrogen, methyl, ethyl, methoxy, ethoxy, halogen or acylamino, $R_3$ and $R'_3$ are independently methyl or ethyl, $R_4$ and $R'_4$ are independently arylene or —$CH_2$-arylene substituted by unbranched $C_{1-6}$alkyl or branched $C_{3-6}$alkyl, —OH, —CN or by further —$SO_3H$ groups, and X is a bridge or a direct bond.

11. A method for producing an inkjet ink, comprising the step of combining a compound of formula (I) according to claim 1, with at least one additional chemical and/or water.

12. A compound according to claim 1, wherein

X is a bridge of N, S or O, or —NH—($C_{1-6}$)-alkylene-NH—, —NH-arylene-NH—, —NH—C(O)—, —NH—C(O)—NH—, —NH—C(O)-A-C(O)—NH—, CO, $SO_2$, NH or a heteroatom, wherein A is a group of the formula —($CH_2$)$_y$— where y is 1, 2, 3, 4, 5, or 6, or a branched $C_{3-6}$ alkyl optionally substituted by —OH or —CN or is —CH═CH—, $C_{3-6}$ alkylene, phenylene, naphthylene or a five-membered or six-membered ring optionally containing one or two heteroatoms.

13. A compound according to claim 12, wherein

A is a five-membered or six-membered ring containing one or two heteroatoms especially N, S or O.

14. A dyed and/or printed organic substrate made in accordance with the process of claim 6.

15. A dyed and/or printed wool, silk or synthetic polyamide article made in accordance with the process of claim 7.

* * * * *